United States Patent Office 3,640,990
Patented Feb. 8, 1972

3,640,990
TERMINATION OF DIENE POLYMERIZATION
Floyd E. Naylor, Bartlesville, Okla., assignor to
Phillips Petroleum Company
No Drawing. Filed June 29, 1970, Ser. No. 50,935
Int. Cl. C08d 1/38, 3/04, 3/08
U.S. Cl. 260—94.7                                       5 Claims

ABSTRACT OF THE DISCLOSURE

A method for terminating the polymerization of monomers, in which polymerization there is formed a metal-terminated polymer, which involves introducing into the reaction mixture a system comprised of a polyisocyanate and a lactone.

---

This invention relates to monomer polymerization.

In one of its more specific aspects, this invention relates to a method of, and to a composition for, terminating such polymerization reactions.

Reactions involving the polymerization of conjugated dienes to form homopolymers or copolymers thereof with vinyl monomers in the presence of an initiator system comprising an alkali metal or hydrocarbyl compound thereof are well known. Such reactions are frequently terminated, or "short-stopped," when the conversion has reached a desired level as a means of influencing the properties of the final polymer. Principal among the properties which it is desired to influence are Mooney viscosity and cold flow.

According to this invention is provided a method for terminating the polymerization of conjugated dienes which involves introducing a polyisocyanate or polyisothiocyanate and a lactone into the reaction mixture.

According to this invention there is also provided a conjugated diene polymerization terminator comprised essentially of a polyisocyanate and a lactone.

Accordingly, it is an object of this invention to provide improved hydrocarbon lithium polymerized polybutadiene and styrene-butadiene copolymers.

It is another object of this invention to provide a polymerization reaction terminating system.

In general, this invention is applicable to processes for the polymerization of conjugated dienes and monomers copolymerizable therewith wherein polymerization is conducted in the presence of a diluent and an alkali metal or organoalkali metal compound corresponding to the general formula $R(M)_x$, in which R is a hydrocarbyl radical selected from the group consisting of aliphatic, cycloaliphatic and aromatic radicals and $x$ is an integer from 1 to 4, inclusive, and M is an alkali metal, preferably lithium. Such processes and reactants as are concerned are exemplified by those described in U.S. Pat. 3,332,917 to Henry L. Hsieh.

This invention is particularly applicable to polybutadiene and butadiene-styrene random or block copolymers prepared in the presence of a butyllithium initiator to produce a lithium-terminated polymer. These polymers are of linear molecular configuration, have a narrow molecular weight distribution, but are poor in cold flow resistance and exhibit low modulus. This invention aids in modifying these polymers to produce improvements in these properties.

This invention concerns a process which employs a composition consisting essentially of polyisocyanates or polyisothiocyanates and lactones. The polyisocyanates or polyisothiocyanates include compounds in which at least one of the groups —N=C=O and —N=C=S is present. Such compounds can be represented by the general formula $R'(NCO)_m$ and $R''(NCS)_n$ wherein R' and R'' are aliphatic, cycloaliphatic or aromatic radicals containing from 2 to about 30 carbon atoms and $m$ and $n$ are integers from 2 to 4, inclusive.

Specific examples of such polyisocyanates and polyisothiocyanates include, but are not limited to, tolylene-2,4-isocyanate, biphenyl-4,4'-diisocyanate, pentane-1,5-diisocyanate, naphthalene-1,3,7-triisocyanate, naphthalene-1,3,5,7-tetraisocyanate, and triphenyl methane triisothiocyanate.

The polymerizable lactones or cyclic esters will have the general formula

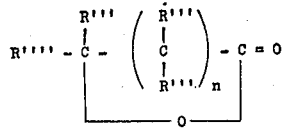

wherein R'''' is hydrogen or a radical of the formula

R''' is hydrogen, alkyl, cycloalkyl, alkenyl, cycloalkenyl, and aryl and combinations thereof; $n$ is the integer 1, 3 or 4; and, the total carbon atoms in the R''' and R'''' substituents is in the range of 1 to about 12. When R'''' is the specified radical, no R''' is attached to the carbon atom to which the specified radical is attached.

While the preferred lactone is ε-caprolactone, other lactones which can be employed are β-propiolactone, and lactones corresponding to such acids as 2-methyl-3-hydroxypropionic acid and 2-methyl-5-hydroxypropionic acid and the like.

The method of this invention is particularly applicable to the use of ε-caprolactone (CL) and tolylene-2,4-diisocyanate (TDI) in combination to terminate the polymerization of 1,3-butadiene initiated by butyllithium and the process will be exemplified by that usage, without meaning to limit the invention thereto.

The addition of the lactone and polyisocyanate or polyisothiocyanate is conveniently made directly to the polymerization reaction zone under the conditions at which the polymerization takes place. However, the termination reaction can be conducted at temperatures ranging from −100° to 150° C., preferably 0° to 100° C. and for times up to about 24 hours, preferably about 10 seconds to 10 minutes. The pressure employed can be below or above atmospheric and is preferably and conveniently the autogenous pressure. The polyisocyanate or polyisothiocyanate and lactone are introduced into the reaction mixture in individual amounts up to about 1.0 part per hundred parts of monomer, but the amounts of the diisocyanate and lactone need not be equal. While the addition of polyisocyanate or polyisothiocyanate and lactone in excess of that required to achieve the maximum change in polymer Mooney viscosity or cold flow is not generally harmful, it is desirable that the least amount of these compounds which is added as a terminating composition is that amount of each, in terms of equivalents of isocyanate or isothiocyanate group and lactone group, which is equal to the equivalents of polymer-bound metal. Preferably, and conveniently, the equivalents of isocyanate or isothiocyanate groups and lactone group can be added in amounts such that each is equal to the equivalents of metal in the polymerization initiator employed.

Regardless of the quantities of the lactone and isocyanate which are employed, their addition to the reaction mixture can be made simultaneously or individually, with either being added first. It has been determined, however, that the terminating composition is most efficient when the lactone is added first; simultaneous addition is a less effective mode of addition and the addition of the polyisocyanate, followed by the addition of the lactone, is the least effective method of addition.

The method of the present invention is illustrated by the following examples. In all of these runs 100 parts by weight butadiene were first polymerized in 780 parts by weight of cyclohexane and 0.096 part by weight of n-butyllithium (1.5 m.h.m.) at 158° F. for one hour. In all runs, a commercial antioxidant was added to the reaction mixture after all other components of the reaction mixture had been added and before the polymers were isolated by coagulation, separated and dried.

In Run 1, neither ε-caprolactone (CL) nor tolylene-2,4-diisocyanate (TDI) was added. In Run 2, TDI, alone, was added. In Run 3, CL, alone, was added. In Run 4, both TDI and CL were added, the CL being added first, the reaction being continued thereafter for 5 minutes after which the TDI was added, the reaction being continued for an additional 10 minutes thereafter. Results were as follows:

TABLE I

| Run Number | CL p.h.m. | CL m.h.m.[1] | TDI p.h.m. | TDI m.h.m. | Mooney Viscosity, ML-4 at 212° F. | Cold flow,[2] mg./min. |
|---|---|---|---|---|---|---|
| 1 | 0 | 0 | 0 | 0 | 3 | 173 |
| 2 | 0 | 0 | 0.13 | 0.75 | 15 | 59 |
| 3 | 0.171 | 1.5 | 0 | 0 | 17 | 47 |
| 4 | 0.171 | 1.5 | 0.13 | 0.75 | 45 | 2.4 |

[1] M.h.m.= Gram milimoles per 100 grams of monomer.
[2] Cold flow is measured by extruding the polymer through a ¼-inch orifice at 3.5 p.s.i. pressure and a temperature of 50° C. After allowing 10 minutes to reach steady state, the rate of extrusion is measured and reported in milligrams per minute.

The above data indicate that different results are obtained with the individual addition of CL and TDI and with their addition as a mixture.

A second series of runs was made to illustrate the effect of the order of addition of the TDI and the CL.

In Run 5, the order of addition was as in Run 4. In Run 6, the TDI and CL were added individually but simultaneously, and the reaction was conducted for 10 minutes thereafter at 158° F. In Run 7, the TDI and CL were added simultaneously combined as a solution. Results were as follows:

TABLE II

| Run Number | CL p.h.m. | CL m.h.m. | TDI p.h.m. | TDI m.h.m. | Mooney Viscosity, ML-4 | Cold flow, mg./min. |
|---|---|---|---|---|---|---|
| 5 | 0.342 | 3.0 | 0.13 | 0.75 | 52 | 0.4 |
| 6 | 0.342 | 3.0 | 0.13 | 0.75 | 30 | 11 |
| 7 | 0.342 | 3.0 | 0.13 | 0.75 | 30 | 15 |

The above data illustrate the effect of the order of addition of the terminating agents.

A third series of runs was made to indicate the effect of varying quantities of the terminating system under the same process of addition. For this purpose, the order of addition of Run 6 was employed, that is, the TDI and CL were added individually and simultaneously, and the reaction was conducted for 10 minutes thereafter at 158° F. Results were as follows:

TABLE III

| Run Number | CL p.h.m. | CL m.h.m. | TDI p.h.m. | TDI m.h.m. | Mooney Viscosity, ML-4 | Cold flow, mg./min. |
|---|---|---|---|---|---|---|
| 8 | 0.171 | 1.5 | 0.13 | 0.75 | 29 | 17 |
| 9 | 0.342 | 3.0 | 0.26 | 1.50 | 16 | 55 |
| 10 | 0.513 | 4.5 | 0.26 | 1.50 | 16 | 48 |

These data illustrates the effect of larger concentrations of the terminating agents when introduced into the reaction mixture.

A fourth run was made to prepare a butadiene-styrene random copolymer. For this purpose, to 780 parts by weight of cyclohexane were added 25 parts by weight of styrene and 75 parts by weight of butadiene; 0.5 parts by weight of tetrahydrofuran and 1.5 m.h.m. of n-butyllithium and the polymerization was conducted for 1 hour at 158° F.; 3.0 m.h.m. of ε-caprolactone was then added and the reaction was continued for 5 minutes at 158° F.; 0.75 m.h.m tolylene-2,4-diisocyanate was then added and the reaction conducted for 10 minutes at 158° F. The commercial antioxident was then added in an amount of 1 part by weight per 100 parts by weight of polymer.

The resulting butadiene-styrene copolymer was recovered by conventional methods and employed in conventional proportions in a conventional vulcanization stock which compared favorably with a commercially-produced rubber compounded in the same recipe.

The vulcanization recipe was as follows, all components therein being well known in the prior art.

| | Parts by weight |
|---|---|
| Polymer | 100 |
| Carbon black | 50 |
| Philrich 5 (Trademark) | 10 |
| Zinc oxide | 3 |
| Stearic acid | 2 |
| Flexamine | 1 |
| Sulfur | 1.75 |
| Santocure | 1.2 |

Comparative tests on the experimental and commercial products when blended in the above were as follows:

| Sample | Experimental Product | Commercial Product |
|---|---|---|
| ML-4, Mooney viscosity | 39 | 39 |
| Cold flow, mg./min. | 0.0 | 0.4 |
| Inherent viscosity | 1.43 | 1.65 |
| 300% modulus, p.s.i., 20 minutes cure | 1,105 | 820 |
| Tensile, p.s.i., 20 minutes cure | 3,010 | 2,570 |
| Elongation, percent, 20 minutes cure | 690 | 730 |

It will be evident from the foregoing that various modifications can be made to this invention. Such, however, are considered as being within the scope of the invention.

What is claimed is:

1. A method for terminating the lithium hydrocarbon initiated polymerization of conjugated diolefin monomers in which polymerization there is formed a lithium-terminated polymer which comprises introducing into the polymerization reaction mixture a polyisocyanate from the group consisting of the formulae $$R'(NCO)_m \text{ and } R''(NCS)_n$$

wherein R' and R'' are aliphatic, cycloaliphatic or aromatic radicals containing from 2 to about 30 carbon atoms and $m$ and $n$ are integers having a value of from 2 to 4, inclusive, and a lactone having the general formula

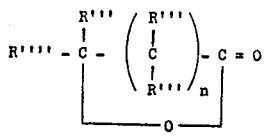

in which R'''' is selected from the group consisting of hydrogen and a radical having the formula

R'''' is selected from the group consisting of hydrogen, alkyl, cycloalkyl, alkenyl, cycloalkenyl and aryl, $n$ is an integer having a value of 1, 3 or 4, and the total carbon atoms in the R''' and R'''' substituents is in the range of 1 to about 12.

2. The method of claim 1 in which said polyisocyanate and said lactone are introduced into the reaction mixture in individual amounts up to about 1.0 parts per hundred parts of monomer.

3. The method of claim 1 in which said lactone is introduced into said reaction prior to said polyisocyanate.

4. The method of claim 1 in which said polyisocyanate is tolylene-2,4-diisocyanate and said lactone is ε-caprolactone.

5. The method of claim 4 in which said polyisocyanate and said lactone are introduced as a mixture.

References Cited

UNITED STATES PATENTS

| | | | |
|---|---|---|---|
| 3,109,871 | 11/1963 | Zelinski | 260—85.1 |
| 3,232,917 | 7/1967 | Hsieh | 260—83.7 |
| 3,281,383 | 10 1966 | Zelinski et al. | 260—23.7 |

JOSEPH L. SCHOFER, Primary Examiner

W. F. HAMROCK, Assistant Examiner

U.S. Cl. X.R.

260—85.1, 92.2 M, 96